United States Patent [19]

Krimm et al.

[11] 4,054,597

[45] Oct. 18, 1977

[54] THIODIGLYCOL POLYCARBONATES

[75] Inventors: Heinrich Krimm; Hans-Josef Buysch; Hermann Schnell, all of Krefeld, Germany

[73] Assignee: Bayer Aktiengesellschaft, Leverkusen, Germany

[21] Appl. No.: 687,437

[22] Filed: May 17, 1976

Related U.S. Application Data

[63] Continuation-in-part of Ser. No. 610,503, Sept. 4, 1975, abandoned.

[30] Foreign Application Priority Data

Sept. 26, 1974 Germany ............................ 2446107
Feb. 10, 1976 Germany ............................ 2605024

[51] Int. Cl.$^2$ .................... C07C 149/14; C08G 63/62
[52] U.S. Cl. ............................ 260/463; 260/47 XA; 260/77.5 D
[58] Field of Search ............. 260/47 XA, 463, 77.5 D

[56] References Cited

U.S. PATENT DOCUMENTS

| 3,046,255 | 7/1962 | Strain et al. ............... 260/463 X |
| 3,275,674 | 9/1966 | Bottenbruch et al. ............... 260/463 |
| 3,646,102 | 2/1972 | Kobayashi et al. ................... 260/463 |
| 3,894,974 | 7/1975 | Hunter et al. ......................... 260/463 |
| 3,966,788 | 6/1976 | Senet et al. ........................... 260/463 |

FOREIGN PATENT DOCUMENTS 1,091,555   10/1960   Germany ............................ 260/463

Primary Examiner—Delbert R. Phillips
Attorney, Agent, or Firm—Gene Harsh; Lawrence S. Pope; Frederick H. Colen

[57] ABSTRACT

The present invention relates to an interfacial process for the production of polycarbonates having terminal, aliphatically bonded hydroxyl groups by reacting predominantly dihydric alcohols with phosgene or chlorocarbonic acid esters of predominantly dihydric alcohols and/or phenols using alkali liquors as HCl-binding agents and in the presence of inert solvents, the process according to the invention being distinguished by the fact that concentrated, aqueous alkali liquors are used as the HCl-binding agents and thiodiglycol, optionally mixed with additional monohydric and polyhydric alcohols, is used as the dihydric alcohol. The present invention further relates to the new polycarbonates produced according to the novel process and to the use of these new polycarbonates for the production of polyurethane plastics.

1 Claim, No Drawings

THIODIGLYCOL POLYCARBONATES

CROSS REFERENCE TO RELATED APPLICATION

This application is a continuation-in-part of copending U.S. application Ser. No. 610,503, filed Sept. 4, 1975 now abandoned.

BACKGROUND OF THE INVENTION

Although thiodiglycol is already mentioned in some of our own earlier literature references (for example, German Patent No. 887,119 and DAS No. 1,031,512) as a possible starting component for the production of polycarbonates by conventional processes, repetition of the corresponding working procedures has shown that it is not possible in this way to obtain polycarbonates based on thiodiglycol (cf. Comparison Examples 1 to 4). Any attempt to transesterify thiodiglycol with dicarbonates, such as diphenyl carbonates, results in vigorous evolution of $CO_2$, and produces condensation products of very low molecular weight having practically no carbonate groups. On the other hand, direct condensation with phosgene or bischloroformic acid esters is accompanied by decomposition of the reaction mixture into products of high chlorine content, the elimination of water and mustard-gas-like compounds. The conclusion to be drawn from the results of these tests is that thiodiglycol polycarbonates are substantially unstable.

SUMMARY OF THE INVENTION

It has now surprisingly been found that high to very high yields of polycarbonates and mixed polycarbonates may also be obtained for the first time from thiodiglycol and, optionally, other dihydroxy compounds, in a clean reaction.

Accordingly, the instant invention relates to an interfacial process for the production of polycarbonates having terminal, aliphatically bonded hydroxyl groups by reacting predominantly dihydric alcohols with phosgene or chlorocarbonic acid esters of predominantly dihydric alcohols and/or phenols using alkali liquors as HCl-binding agents and in the presence of inert solvents, the process according to the invention being distinguished by the fact that concentrated, aqueous alkali liquors are used as the HCl-binding agents and thiodiglycol, optionally mixed with additional monohydric and polyhydric alcohols, is used as the dihydric alcohol.

The present invention also relates to the new polycarbonates obtained by the process according to the present invention having terminal aliphatic hydroxyl groups, a molecular weight in the range of from about 400 to 20,000, preferably from about 800 to 5000 and most preferably from about 1200 to 2500, and containing structural units corresponding to the formula:

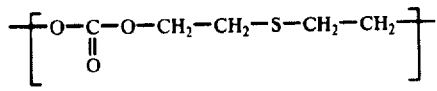

In addition, the present invention relates to the use of the new polycarbonates as starting components for the production of polyurethane plastics.

DETAILED DESCRIPTION OF THE INVENTION

As mentioned above, it is possible in accordance with the present invention to use a preparation of other dihydroxy compounds and, optionally, monohydric alcohols and polyhydric alcohols, in addition to thiodiglycol in the production of the polycarbonates. However, the proportion of thiodiglycol, based on the total quantity of hydroxyl compounds used, should amount to at least about 25 mol % and preferably to at least about 50 mol % and most preferably to more than about 70 mol %.

Such additional dihydric alcohols suitable for use in the process according to the invention include ethylene glycol, diethylene glycol, triethylene glycol, polyethylene glycols, 1,2-propane diol, 1,3-propane diol, 1,3-butane diol, 1,4-butane diol, 1,6-hexane diol, 2,2-dimethyl-1,3-propane diol, 2-ethyl-1,3-propane diol, 2-ethyl-1,3-hexane diol, cyclo-1,4-hexane diol, cyclo-1,4-hexane dimethanol, 2,2-bis-(4-hydroxy cyclohexyl)-propane, p-xylylene glycol, p-tetrachloroxylylene glycol and the ethoxylation and hydroxy propylation products of dihydric alcohols or phenols such as bis-ethoxyl-bisphenol A, bis-ethoxy-tetrachlorobisphenol A and bis-ethoxyl-tetrachlorohydroquinone.

Higher alcohols may also be co-condensed to a certain extent, especially where provision is made for a limited chain length by suitably selecting the ratio between the carbonic acid component and the hydroxyl components so that crosslinking is avoided. Monohydric alcohols may also be used for limiting the chain length.

Examples of suitable higher alcohols include glycerol, trimethylol ethane, trimethylol propane, hexane triol and pentaerythritol. Examples of monohydric alcohols include methanol, ethanol, propanol, isopropanol, butanol, cyclohexanol, octanol, 2-ethyl hexanol and dodecanol.

In addition to the above-mentioned alcohols, suitable chlorocarbonic acid esters include the bis-chlorocarbonic acid esters of dihydric phenols such as, for example, hydroquinone, resorcinol, 2,2-bis-(4-hydroxyphenyl)propane, 2,2-bis-(4-hydroxy-3,5-dichlorophenyl)-propane, di-4-hydroxy phenyl ether, di-4-hydroxy phenyl sulphide and di-4-hydroxy phenyl sulphone.

In the context of the instant invention, concentrated alkali solutions are about 30 to 50% by weight aqueous solutions of sodium and potassium hydroxide.

Inert solvents suitable for use in accordance with the invention include methylene chloride, chloroform, ethylene chloride, 1,2-dichloropropane, toluene and chlorobenzene.

Tertiary amines, such as triethylamine, tributylamine, dimethyl cyclohexylamine or pyridine, may be used as catalysts, especially for reacting the remaining terminal chlorocarbonyl groups as the reaction nears completion. Quantities of from about 0.001 to 3% by weight, based on the quantity of the alcohol component, are generally required for this purpose.

In general, it is not possible in accordance with the invention to use the procedure normally adopted for the production of aromatic polycarbonates, i.e. introducing phosgene into a mixture of the dihydric alcohol, concentrated alkali solution and solvent, since the alkali solution and alcohol would react immediately on admixture with considerable evolution of heat to form the corresponding alcoholates which would form a solid, crystalline and unstirrable mass.

For this reason, it is best to carry out the process according to the present invention in several of the following different ways:

1. Phosgene is introduced with stirring into a solution of thiodiglycol or a mixture of thiodiglycol and one or more other hydroxyl compounds, accompanied by the dropwise addition of concentrated alkali liquor in such a way that some excess sodium hydroxide is always present in the reaction mixture.
2. Thiodiglycol or a mixture of thiodiglycol with one or more other hydroxyl compounds is initially reacted either as such or in solution with the calculated quantity of phosgene, preferably below room temperature, to form chloroformic acid esters and the precondensate thus obtained built-up into polycarbonates by the addition of concentrated alkali liquor.
3. Separately-prepared bis-chloroformic acid esters of one or more other hydroxyl compounds are condensed with thiodiglycol in the presence of concentrated alkali liquor.

The process may be carried out both in batches and continuously (for example, in cascades of stirrer-equipped vessels or in recirculating pump reactors).

The process according to the invention is generally carried out at temperatures in the range from about −20° to 100° C and preferably at temperatures in the range from about 0° to 50° C.

In order to reduce the solubility of the hydroxyl compounds in the aqueous phase and the viscosity of the alkali liquor, it is advisable in some cases additionally to use a concentrated electrolyte solution, more especially a sodium or potassium chloride solution such as is formed in any event during the reaction.

An advantage of the process according to the invention is that, in contrast to known high-temperature phosgenation processes where free hydrogen chloride is given off, extremely pure polycarbonates having a low content of unhydrolyzable chlorine which reduces the functionality of the polycarbonate (i.e. the number of terminal hydroxyl groups) are obtained. In addition, any process in which no free hydrogen chloride is given off is particularly advantageous for the simple reason that there is no danger of corrosion damage.

The end products obtained by the process according to the invention may be used for a variety of commercial applications. For example, they may be used as plasticizers and lubricants. In particular, they are of considerable interest as relatively high molecular weight starting components containing hydroxyl groups for the production of polyurethanes. They are especially valuable for this particular application because they do not contain troublesome terminal groups or impurities as do the aliphatic polycarbonates generally obtained by prior art processes. For example, the polycarbonates produced by conventional phosgenation in anhydrous medium have an undesirably high chloride content due to the reaction between terminal hydroxyl groups and hydrogen chloride. Polycarbonates obtained by transesterification with diphenyl carbonate can only be freed from phenol or terminal phenol ester groups with some difficulty, i.e. at temperatures at which the polycarbonates give off carbon dioxide. By contrast, the polycarbonates according to the invention contain very little aliphatically bonded chloride. The products necessarily have substantially their theoretically calculated OH-functionality and are free from troublesome impurities. Additionally, the polycarbonates according to the present invention are particularly valuable for this application because polyurethane elastomers produced from them show excellent mechanical properties.

A further advantage is the liquid consistency of the polycarbonates at slightly elevated temperatures or even at room temperature which makes them easily workable in the usual equipments of polyurethane chemistry.

In cases where the polycarbonates according to the present invention are used for the production of polyurethane plastics, they are reacted in known manner with polyisocyanates, optionally in conjunction with other relatively high molecular weight polyhydroxyl compounds (polyesters or polyethers) and the conventional chain-extending agents (low molecular weight diols and/or diamines). The polycarbonates according to the present invention may be reacted both with aliphatic and with cycloaliphatic, araliphatic, aromatic or heterocyclic polyisocyanates. A detailed description of compounds such as these is given, for example, by W. Siefken in Justus Liebig's Annalen der Chemie, 562, pages 75 to 136.

The process according to the present invention is illustrated by the following Examples in which the figures quoted represent parts by weight and percent by weight, unless otherwise indicated.

EXAMPLES

EXAMPLE 1

100 g of a 45% sodium hydroxide solution (1.1 mol) are added dropwise with vigorous stirring over a period of 30 minutes at 15° C to a solution of 120.5 g (0.5 mol) of cyclo-1,4-hexane diol bis-chlorocarbonic acid ester and 61 g (0.5 mol) of thiodiethylene glycol in 300 ml of methylene chloride. The temperature is allowed to rise to 30° C, followed by cooling to room temperature. After 1.5 hours, 200 ml of water are added, the organic layer dried twice over sodium sulphate and the solvent removed under reduced pressure. The residue is a colorless soft resin. Yield: 133 g or 92% of the theoretical.

EXAMPLE 2

99 g (1 mol) of phosgene are introduced over a period of from 2 to 3 hours with stirring at from −2° to −7° C into a solution of 131 g (1.07 mol) of thiodiglycol in 1 liter of methylene chloride. After another 30 minutes at 0° C, 268 g (corresponding to 3 mols) of 45% sodium hydroxide solution are added dropwise with stirring over a period of 30 minutes at a temperature rising slowly from 2° C to from 13 to 15° C. 30 minutes later, 200 ml of water are quickly added dropwise followed, after another 30 minutes, by the dropwise addition of 0.4 g of triethylamine. After stirring for 15 minutes, the phases are separated, any undissolved sodium chloride is dissolved with a little water, the aqueous phase is extracted with methylene chloride, the combined organic phases are washed with water, dried over sodium sulphate and concentrated by evaporation while stirring at a sump temperature of up to 80° C/15 Torr. The yield of thickly liquid, colorless polycarbonate amounts of 130 g, corresponding to 87% of the theoretical yield. The total chlorine content amounts to 0.32%, of which 0.03% represents hydrolyzable and inorganic chlorine. The molecular weight amounts to 1450 (numerical average).

EXAMPLE 3

140 g (1.4 mol) of phosgene are introduced over a period of 2 hours at from 15 to 20° C into a solution of 122 g (1 mol) of thiodiglycol in 500 ml of methylene chloride. At the same time, 311 g (3.5 mols) of 45% sodium hydroxide solution are added dropwise in such a way that a slight excess of sodium hydroxide over the phosgene introduced is always present in the reaction mixture. After stirring for 30 minutes at room temperature, 0.15 liter of water and 0.4 ml of triethylamine are added dropwise, followed by stirring for another 2 hours and working-up in the same way as in Example 2. The yield amounts to 89 g of polycarbonate, corresponding to 60% of the theoretical yield, having a chlorine content of 0.19% (of which 0.003% represents hydrolyzable and inorganic chlorine).

EXAMPLE 4

215 g (1 mol) of 1,4-butane diol bis-chloroformic acid ester and 220 g (2.5 mols) of 45% sodium hydroxide solution are simultaneously added dropwise with stirring and cooling over a period of from 1 to 2 hours at room temperature to a mixture of 161 g (1.07 mol) of thiodiglycol, 600 ml of methylene chloride and 100 g of concentrated sodium chloride solution, in such a way that sodium hydroxide is always present in the reaction mixture in a slight excess over the bis-chloroformic acid ester already added. After stirring for from 1 to 2 hours at room temperature, 50 ml of water and 0.5 ml of triethylamine are added and the reaction mixture maintained under the reaction conditions for another 3 hours.

The phases are separated, the aqueous phase is extracted with methylene chloride, the combined organic phases are washed with heavily dilute phosphoric acid and water, dried over sodium sulphate and concentrated by evaporation, ultimately at a sump temperature of 100° C/20 Torr. The yield of pale yellow, thickly liquid polycarbonate amounts to 276 g, corresponding to 93% of the theoretical yield, the chlorine content amounts to 0.26% (of which 0.002% represents hydrolyzable and inorganic chlorine) and the OH-number to 77.

EXAMPLE 5

950 g (3.91 mols) of 1,6-hexane diol bis-chloroformic acid ester and 1000 g (11.5 mols) of 45% sodium hydroxide solution are added dropwise to a mixture of 510 g (4.18 mols) of thiodiglycol, 1000 ml of methylene chloride and 340 g of concentrated sodium chloride solution. Later 200 ml of water and 2.4 g of triethylamine are added. The reaction and working-up of the reaction product are carried out in the same way as in Example 4. The yield of thickly liquid, substantially colorless polycarbonate amounts to 1110 g or 97% of the theoretical yield, the chlorine content amounts to 0.13% (of which < 0.001% represents hydrolyzable and inorganic chlorine) and the OH-number to 56.

COMPARISON EXAMPLE 1

122 g (1 mol) of thiodiglycol are added dropwise with stirring over a period of 30 minutes at room temperature to a solution of 297 g (3 mols) of phosgene in 2000 g of methylene chloride, after which the reaction mixture is left standing for from 1 to 1.5 hours at room temperature. Excess phosgene, hydrogen chloride and solvent are then distilled off under reduced pressure up to a temperature of at most 40° C.

The yellow sump product obtained smells strongly of mustard gas, decomposes in distillation tests and cannot be further purified. Accordingly, it is obviously not possible to produce the bis-chlorocarbonic acid ester of thiodiglycol by conventional methods.

COMPARISON EXAMPLE 2

A mixture of 122 g (1 mol) of thiodiglycol, 97 g (1.1 mol) of glycol carbonate, 0.06 g of lithium hydroxide and 200 g of xylene is heated with stirring to reflux temperature in a flask equipped with a stirrer and an approximately 60 cm long packed column having a phase separator at its head. Glycol distills over with xylene at a sump temperature of from 136° to 138° C, settling in the phase separator. $CO_2$ is given off during the transesterification reaction. After 24 hours, 61 g of glycol have been separated off, corresponding to 98.5% of the theoretical value. The reaction mixture is brown in color. Xylene is initially removed by distillation under reduced pressure. A fraction boiling at 100° 110° C/10 Torr is then obtained, followed finally by a fraction boiling at 150° – 180° C/14 Torr. A dark brown, evil-smelling thickly liquid residue (30 g) which does not contain any carbonate groups is left behind.

COMPARISON EXAMPLE 3

A mixture of 872 g (7.15 mols) of thiodiglycol and 1428 g (6.67 mols) of diphenyl carbonate is melted and phenol distilled off in an oil pump vacuum at from 110 to 120° C (transition temperature 83° – 96° C). Even at this moderate transesterification temperature, large quantities of $CO_2$ are given off so that the pressure cannot be reduced below 10 Torr, even with a high vacuum pump. After the elimination of phenol has virtually ceased the sump temperature is briefly increased to 160° C, as a result of which residues of volatile fractions distill over. A yellow residue having a molecular weight of 247 (weight average, as measured in acetone) is obtained. A molecular weight of approximately 2000 had been expected from the above quantitative ratio of the reactants. The saponification number is 39, whereas a polycarbonate of thiodiglycol has a theoretical saponification number of 746, i.e. virtually no ester groups are present.

COMPARISON EXAMPLE 4

A mixture of 121.5 g (0.5 mol) of 1,6-hexane diol bis-chloroformic acid ester and 63.5 g (0.52 mol) of thiodiglycol is slowly heated in a water jet vacuum, HCl being given off. However, water and organic constituents are also eliminated with the hydrogen chloride. The evolution of hydrogen chloride is over after from 10 to 12 hours, ultimately at a sump temperature of 165° C/10 Torr. A yellow-brown, evil-smelling oil having a chlorine content of 12.3% (no chloroformic acid ester chlorine!) is obtained. The distillate consists of 1.5 g of $H_2O$ and 3.2 g of an organic liquid which contains Cl and S and smells strongly of mustard gas.

EXAMPLE 6

200 g of the liquid product produced in Example 5 are dehydrated at 130° C/12 mm pressure. 36 g of 1,5-naphthylene diisocyanate are introduced with stirring, the reaction temperature initially falling to approximately 120° C. After about 10 minutes, the temperature has risen to 128° C. 1,4-butane diol is then stirred over a period of 30 seconds into the reaction product cooled to 110° C, and the reacting melt poured into molds preheated to 110° C. After from 12 to 13 minutes, the molds may be opened and, after the molding has been tempered for 24 hours, at 110° C, a highly elastic polyurethane having the following physical properties is obtained:

| Test | Test specification | |
|---|---|---|
| Shore hardness A | DIN 53 505 | 88–90 |
| Tensile strength | DIN 53 504 | 17 MPa |
| Elongation at break | DIN 53 504 | 560 % |
| Strain at 100% elongation | DIN 53 504 | 6 MPa |
| 300% | | 10 MPa |
| Tear propagation resistance (graves) | DIN 53 515 | 46 KN/m |
| Shock elasticity | DIN 53 512 | 40 % |

EXAMPLE 7

The procedure is as in Example 6, except that 5.4 g of thiodiglycol are used instead of the 4 g of 1,4-butane diol. The moldings may be removed from the mold after from 40 to 45 minutes. A highly elastic polymer having the following physical properties is obtained after tempering for 24 hours at 110° C:

| Test | Test specification | |
|---|---|---|
| Shore hardness A | DIN 53 505 | 88 |
| Tensile strength | DIN 53 504 | 52 MPa |
| Elongation at break | DIN 53 504 | 600 % |
| Strain at 100% elongation | DIN 53 504 | 5 MPa |
| 300% | | 8.5 MPa |
| Tear propagation resistance (graves) | DIN 53 515 | 35 KN/m |
| Shock elasticity | DIN 53 512 | 42% |

EXAMPLE 8

200 g of the liquid product produced in accordance with Example 5 are mixed at 110° C with 18 g of 1,4-butane diol, the resulting mixture is stirred for 30 seconds at that temperature with 80 g of molten 4,4'-diphenyl methane diisocyanate and the melt is poured into molds preheated to 110° C. After from 10 to 12 minutes, the molding may be released and, after tempering for 24 hours at 110° C, a high-grade material having the following properties is obtained:

| Shore hardness A | 90–92 |
|---|---|
| Tensile strength | 18.8 MPa |
| Elongation at break | 510% |
| Strain at 100% elongation | 7.5 MPa |
| 300% | 11.2 MPa |
| Tear propagation resistance | 64 KN/m |
| Shock elasticity | 36% |

EXAMPLE 9

When 200 g of the product produced in accordance with Example 4 (OH-number 94) and 4 g of butane diol are mixed at 110° C and the resulting mixture stirred for 30 seconds with 60.4 g of 1,5-naphthylene diisocyanate, a melt is formed and is poured into molds which may be opened after from 20 to 30 minutes. After the molding has been tempered for 24 hours at 110° C, a highly elastic material having the following properties is obtained:

| Shore hardness A | 94 |
|---|---|
| Tensile strength | 19.5 MPa |
| Elongation at break | 492 |
| Strain at 100% elongation | 7.93 MPa |
| 300% | 11.23 MPa |
| Tear progagation resistance | 61 KN/m |
| Shock elasticity | 38% |

What is claimed is:

1. A polycarbonate containing terminal aliphatic hydroxyl groups, having a molecular weight of from about 400 to 20,000 and containing at least about 25 mol % of structural units corresponding to the formula:

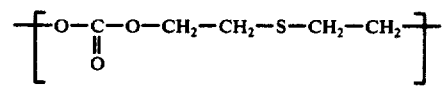

prepared by reacting predominantly dihydric alcohols with phosgene or chlorocarbonic acid esters of predominantly dihydric alcohols and/or phenols by a phase interface process using concentrated, aqueous alkali solutions as hydrogen chloride binding agents and in the presence of inert solvents, said process characterized by the fact that thiodiglycol, optionally mixed with additional monohydric and polyhydric alcohols, is used as the dihydric alcohol in amounts of at least 25 mol %, based on the total mols of hydroxyl compounds used.

* * * * *